United States Patent [19]
Petilli

[11] Patent Number: 4,918,543
[45] Date of Patent: Apr. 17, 1990

[54] APPARATUS FOR THRESHOLDING AN IMAGE SIGNAL

[75] Inventor: Eugene M. Petilli, Henrietta, N.Y.

[73] Assignee: Eastman Kodak Company, Rochester, N.Y.

[21] Appl. No.: 301,679

[22] Filed: Jan. 24, 1989

[51] Int. Cl.$^4$ .......................................... H04N 1/032
[52] U.S. Cl. ................................... 358/465; 358/454; 358/457
[58] Field of Search ............... 358/454, 457, 458, 462, 358/463, 465, 466; 382/31, 42, 50, 63; 250/578

[56] References Cited

U.S. PATENT DOCUMENTS

| | | |
|---|---|---|
| 3,723,649 | 3/1973 | Pitegoff et al. .................. 358/463 |
| 4,258,393 | 3/1981 | Ejiri et al. ...................... 358/283 |
| 4,282,511 | 8/1981 | Southgate et al. ............... 382/31 |
| 4,288,821 | 9/1981 | Lavallee et al. . |
| 4,315,285 | 2/1982 | Sommer et al. ................. 358/466 |
| 4,328,425 | 5/1982 | Stoffel . |
| 4,328,426 | 5/1982 | D'Ortenzio . |
| 4,339,774 | 7/1982 | Temple . |
| 4,345,314 | 8/1982 | Melamud et al. . |
| 4,349,846 | 9/1982 | Sekigawa . |
| 4,409,623 | 10/1983 | Kobayashi et al. . |
| 4,468,704 | 8/1984 | Stoffel et al. ................... 358/466 |
| 4,496,987 | 1/1985 | Yuasa et al. . |
| 4,499,493 | 2/1985 | Nishimura ...................... 358/463 |
| 4,509,195 | 4/1985 | Nadler . |
| 4,517,605 | 5/1985 | Yokomizo . |
| 4,577,235 | 3/1986 | Kannapell et al. . |
| 4,593,325 | 6/1986 | Kannapell et al. . |
| 4,601,056 | 7/1986 | Habitzreiter et al. . |
| 4,636,650 | 1/1987 | Ishikawa ........................ 358/465 |
| 4,651,293 | 3/1987 | Kato . |
| 4,694,342 | 9/1987 | Klees ............................. 358/463 |
| 4,723,173 | 2/1988 | Tanioka . |
| 4,729,032 | 1/1988 | Nishiyama et al. ............. 358/77 |
| 4,736,439 | 4/1988 | May .............................. 382/31 |
| 4,755,813 | 7/1988 | Williams . |
| 4,757,389 | 7/1988 | Clark et al. .................... 358/457 |
| 4,760,463 | 7/1988 | Nonoyama et al. . |
| 4,760,605 | 7/1988 | David et al. ................... 358/37 |
| 4,783,838 | 11/1988 | Matsunawa ..................... 358/451 |

Primary Examiner—Howard W. Britton
Assistant Examiner—Kim Yen Vu
Attorney, Agent, or Firm—Dennis R. Arndt

[57] ABSTRACT

This invention relates to an apparatus for converting a grayscale image to a bitonal image which provides improved tonal rendition with minimal loss of resolution. The invention attenuates the low spatial frequency component of the digital image and uses a similarly attenuated thresholder to convert the image to a bitonal image. When used with a dither type thresholder, this technique allows for simultaneous "continuous tone" and "line art" thresholding with minimal circuit complexity.

10 Claims, 6 Drawing Sheets

APPARATUS FOR THRESHOLDING AN IMAGE SIGNAL

TECHNICAL FIELD OF THE INVENTION

This invention relates generally to processing image data obtained by scanning a picture, document or other image and more particularly, by using a single processing apparatus capable of showing improved tonal rendition and improved resolving power for text, thus a single scanning and processing apparatus can scan both text and halftone portions of an original image including both.

CROSS-REFERENCE TO RELATED APPLICATIONS

Reference is made to commonly-assigned, copending U.S. patent application Ser. No. 07/301677, entitled "METHOD FOR THRESHOLDING AN IMAGE SIGNAL", in the name of E. Petilli and filed concurrently herewith.

BACKGROUND OF THE INVENTION

Grayscale image data is obtained by scanning an image with a suitable device, for example, a scanner comprising a plurality of charge-coupled devices (CCD's). The scanner effectively divides the image into a finite number of small picture elements referred to as pels or pixels. Each pixel of a scanned image is converted into a number representative of the grayscale value of the pixel as detected by a CCD scanner cell.

The image is ultimately to be applied to a bilevel device i.e., a device which reproduces each pixel as one of two grayscale values for duplication or display of the image. For a typical bilevel image duplication device, the two grayscale values are black or white and correspond to print or no print picture elements, respectively.

The determination of which pixels are to be printed or left not printed for duplication of a given image depends to some extent on the characteristics of the image. For example, portions of the image may be classified as either continuous tone or text. Photographs are an example of a continuous tone image while text is exemplified by line drawings and letter images.

For text data, the conversion from grayscale values to binary to often accomplished by establishing a threshold to which the grayscale value of each pel is compared. The result of the comparison is that if the grayscale value exceeds the threshold, a block or print representation is selected for the pel and conversely, if the threshold is not exceeded, the pel is left white or not printed.

For continuous tone image data, alternate techniques are applied. For example, a variety of pel block patterns may be selected to represent blocks of the continuous tone image data dependent upon the composite grayscale value of the blocks. For continuous tone image data, pel block patterns may be shifted, rotated or otherwise varied to prevent the appearance of interference patterns such as Moire patterns.

Use of a digital filter is also common in imaging systems to "enhance" an image before thresholding. Typically a one dimensional or two dimensional Finite Impulse Response (FIR) convolution filter is used. The FIR is programmed such that the sum of the coefficients is equal to one, thereby yielding unit gain at DC (zero frequency) so as to preserve the tonal qualities of the image.

U.S. Pat. No. 4,723,173, entitled IMAGE PROCESSING APPARATUS and U.S. Pat. No. 4,288,821, entitled MULTI-RESOLUTION IMAGE SIGNAL PROCESSING APPARATUS AND METHOD. In both patents, a decision is made of whether use "line art" having a first threshold or whether a "continuous tone" algorithm should be used to process the image data. These types of discriminators that switch between two different processing circuits depending on the type of data occurring at the input can be highly complex and often requiring more circuitry than the two thresholding circuits combined. Image processors of this type tend to utilize separate circuitry for processing "line art" (text material) and continuous tone images. These processes tend to respond differently for black to white and white to black transitions.

DISCLOSURE OF THE INVENTION

This invention relates to an apparatus for processing an image signal derived by raster scanning document originals comprising means for converting the raster scanned image signals into a digital signal. DC offset means removes a predetermined DC level from the digital signal resulting in a predetermined DC offset. Digital attenuation means having less than unity gain is next applied to the digital signal so as to provide a DC attenuation of the signal and a dither conversion means that uses a main dither matrix to perform a dither conversion on the digital signal.

It is an object of the present invention to provide improved tonal rendition and improved resolving power in a scanned image by using a simple apparatus without the need for pre-scanning the image. In addition, it is not necessary to have separate circuitry for two processing algorithms and discriminators. Use of the present invention results in minimal artifacts because it does not switch algorithms and therefore, provides similar treatment for white to black and black to white transitions.

BRIEF DESCRIPTION OF THE DRAWINGS

The teachings of the present invention may be readily understood by considering the following detailed descriptin in conjunction with the accompanying drawings, in which.

DETAILED DESCRIPTION

Figure 1:
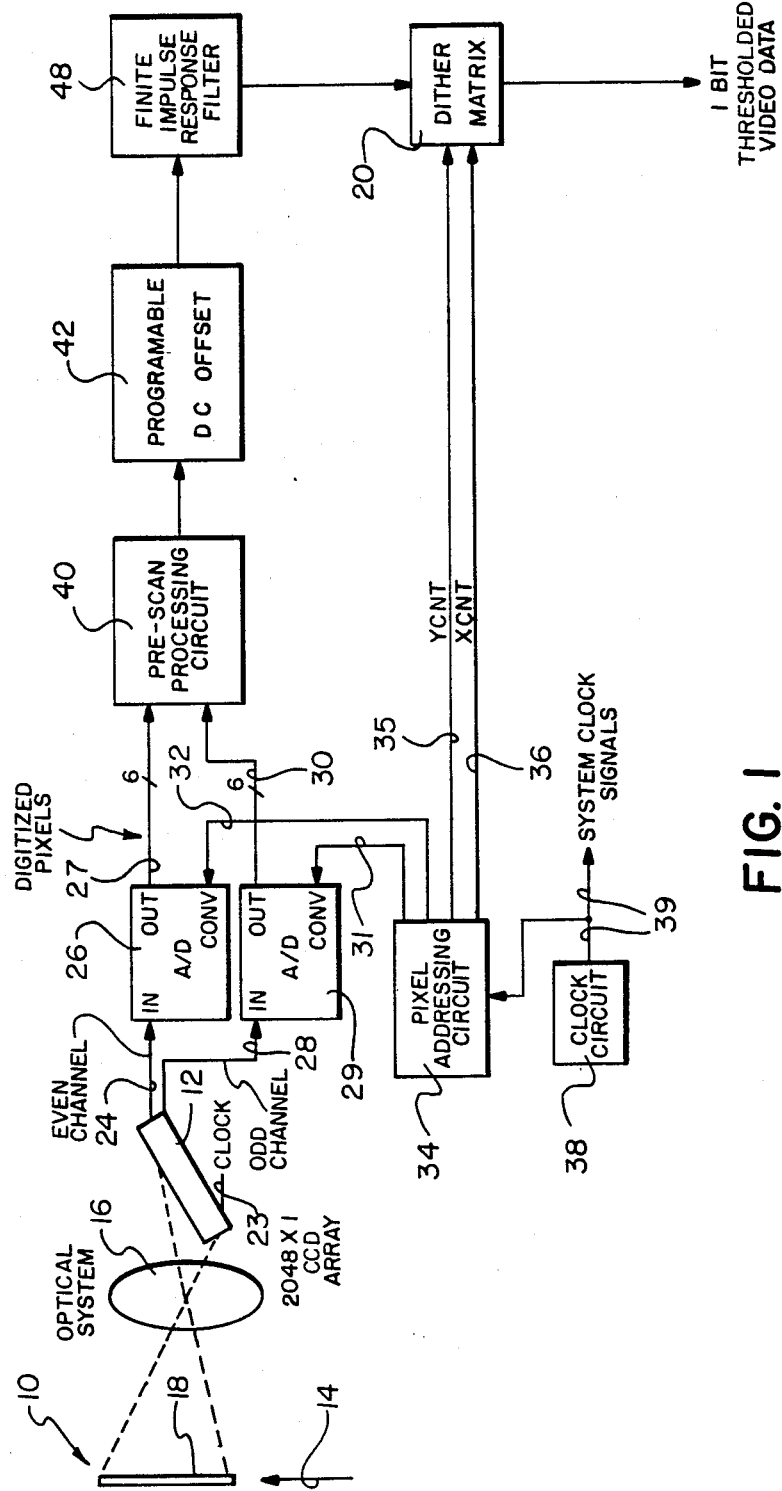
FIG. 1 depicts a block diagram of an embodiment of the image signal processing apparatus in accordance with the teachings of the present invention.

A block diagram of one embodiment of a document scanning and image processing apparatus, is shown in FIG. 1. In essence, the system enhances a scanned multi-bit grayscale image to sharpen image edges therein and then threshold the enhanced image into a single bit binary video signal.

The document 10, as shown generally, is scanned one line at a time by a scanner and specifically by a 5000-by-1 cell charge coupled device (CCD) array 12 located therein. The array 12 is positioned in front of the document and is perpendicularly oriented to the direction of travel of the document shown by arrow 14. A light source (not shown) illuminates the document 10 and light reflected therefrom enters the optical system 16. Optical system 16 ensures that light is focused on the CCD array 12. In practice, optical system 16 is set to overscan each horizontal scanning line so the full image will be scanned even if document 10 was off center or tilted and/or if the CCD 10 becomes slightly horizontally mis-aligned with respect to the document.

As a result of this scanning operation, each cell of the CCD array 12 provides an analog output which is proportional to the intensity of the light that is reflected from a portion of scanned area 18 and which is focussed onto that cell. Each of two CCD channels provides cells; one group for the odd pixels and the other for the even pixels. Under control of the appropriate clocking signals applied, via lead 23 to the CCD array, a stream of sequential pixels for both the even and odd channels are simultaneously shifted out of the array on leads 24 and 28 for the even and odd pixels, respectively, for each scanned line in scanned document 10. Each channel of pixel information is then converted by a respective analog-to-digital (A/D) converter. Specifically, A/D converter 26 receives even channel pixel information over lead 24 emanating from CCD array 12 and under control of appropriate "convert" control pulses appearing on lead 32, provides eight-bit digital equivalent pixel values on leads 27. Likewise, A/D converter 29 receives odd channel pixel information over lead 28 emanating from CCD array 12 and, under control of appropriate convert pulses appearing on lead 31, provides eight-bit digital equivalent pixel values on leads 30. The convert pulses are provided by pixel addressing circuit 34. This circuit also generates the (X,Y) address of the current pixel in the document that is being scanned. This address consists of vertical (Y) pixel address, YCNT (Y count), appearing on leads 35 and horizontal (X) pixel address, XCNT (X count), appearing on leads 36. System clock pulses are provided by clock circuit 38 and appear on lead 39.

Pre-scan processing circuit 40 includes a multiplexer (not shown) that routes incoming pixels on an alternating basis from even channel leads 27 and odd channel leads 30 to a single stream of pixel information. All timing and control signals for the multiplexer are controlled by system clock signals appearing over lead 39. The multiplexer produces a single stream of pixels. If desired, the pre-scan processing circuit may also include a shading correction circuit and a gamma correction circuit. The shading correction circuit stores appropriate correction factors about illumination falloff and optical correction factors to insure uniform illumination of the image. A gamma correction circuit also stores information that is used to compensate ffor different transfer characteristics occurring among different types of film. These characteristics generally include intensity rolloff, film rise, distance, and the like. Use of such a circuit would be more appropriate when scanning microfilm instead of original documents.

After A/D converters 26, 29 digitize the image signal into 256 levels and the signal was passed through pre-scan processing circuit 40. The signal is next sent to a programmable DC offset circuit 42 where the 0–255 8-bit/pixel unsigned data is then converted to signed data by subtracting a programmably fixed DC offset equal to approximately one half of the expected peak to peak range of the input signal. This results in signal pixel values typically from −128 to 127. Signed numbers are necessary to allow the following DC attenuation section to reduce the low spatial frequency component towards zero while maintaining the original "polarity" of the data. The subtraction can be done by a discrete adder/subtracter or alternatively, may be done in conjunction with a Gamma Correction circuit (not shown) or a shading correction circuit (not shown) or in digital filter 48.

The signed signal data is then "DC attenuated" using a finite impulse response (FIR) digital filter 46. Use of a finite impulse response (FIR) convolution filter requires that, the coefficients (tap weights) be selected to sum to between 0–1 where this sum defines the DC gain (1-DC attenuation). A second FIR convolution filter may be used for iamge enhancement and the coefficients of both filters can be combined to establish a new set of coefficients appropriate for the single filter.

Figure 2:
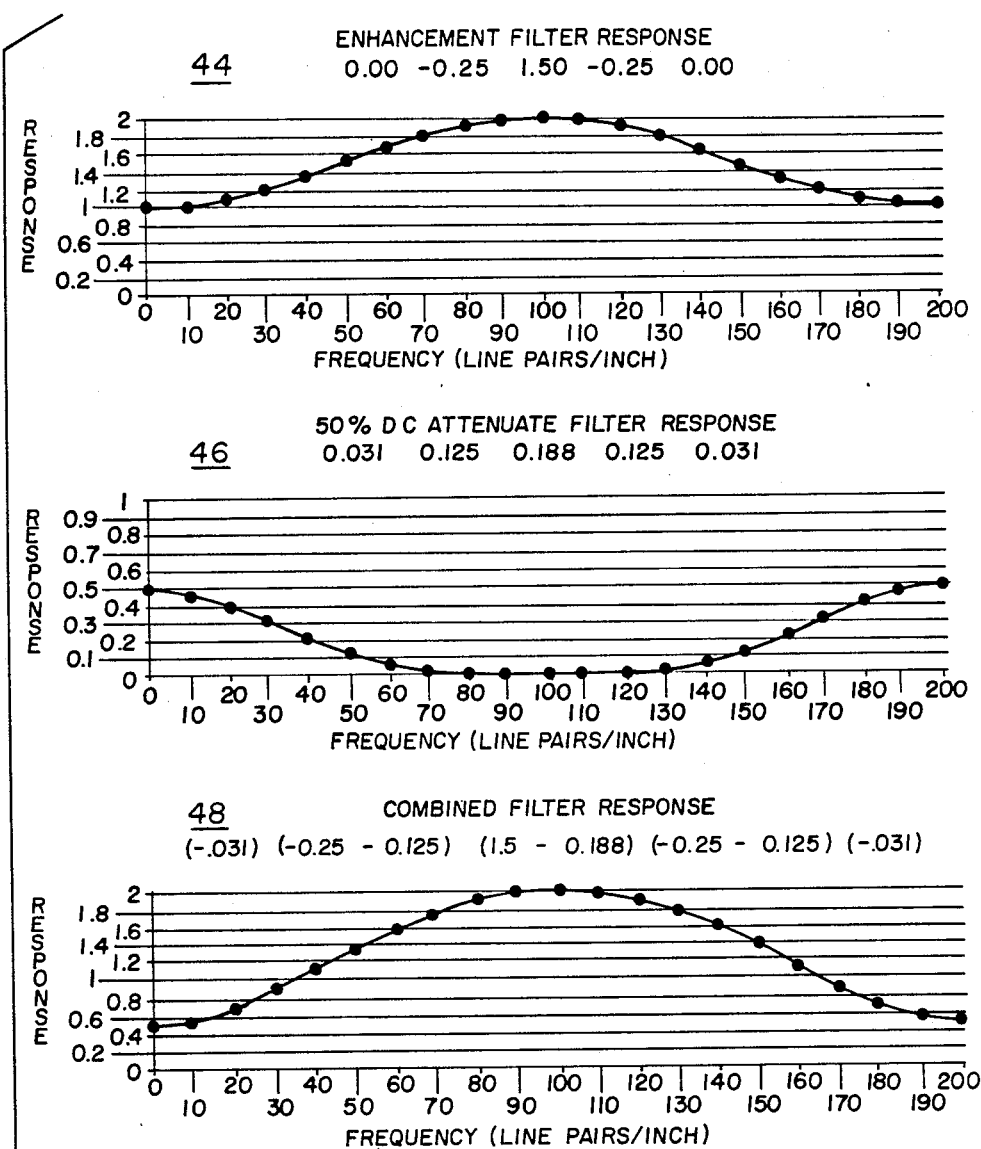
FIG. 2 depicts a graphics representation of the filter response of the enhancement filter and attenuation filter response and their combined filter response using one dimensional FIR filter with the filter coefficients (tap weight) presented below the titles.

FIG. 2 illustrates the one dimensional filter responses for the enhancement filter 44 and the 50% DC attenuation filter 46. The final response curve represents the combined filter response 48. Once an understanding of the one dimensional case is made, the two dimensional case is a simple extension.

In the graph showing the response for the one dimensional enhancement filter the gain at zero frequency or DC is one. The gain increases to a gain of two units at a frequency of 100 line pairs per inch in the case of a 200 dot per inch scanner. The numbers under the title are the coefficients (tap weights) that will be used in the enhancement filter 44 to achieve the desired frequency response. Similarly, the second graph illustrates the response characteristics of a DC attenuation filter 46 and its coefficients.

The third graph illustrates the combined response 48 after combining the other two response curves 44 and 46. The response characteristics of the attenuation filter 46 is subtracted from the response curve of the enhancement filter 44 resulting in a combined filter response 48 that has the DC response of the attenuation filter 46 and the high frequency response of the enhancement filter 44. Thus, it can be seen that if the attenuation filter 46 had a 70% (taps sum to 0.7) DC attenuation, the DC response of the combined filter 48 would be 30%. Best results have been obtained using a DC attenuation of between 70%–80% with the combined response being 30%–20% respectively.

Figure 3:
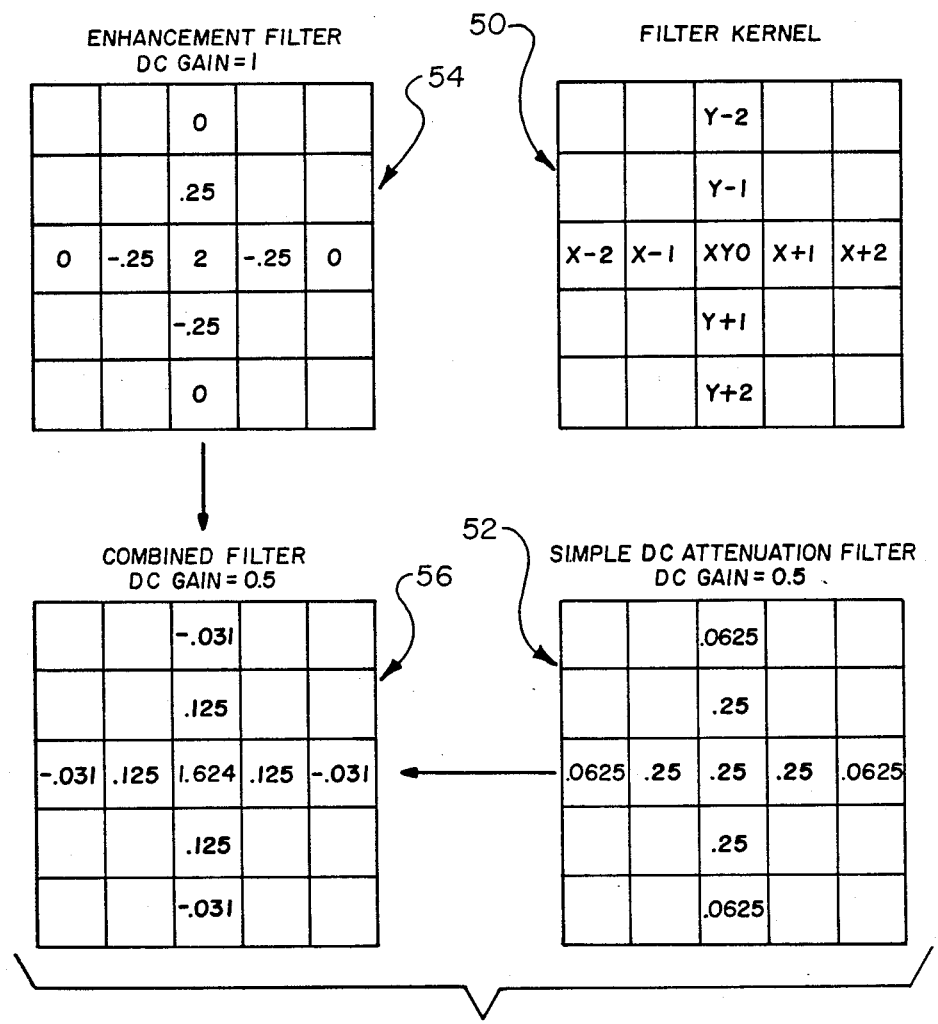
FIG. 3 depicts the basic form of the filter kernel in the upper right of the drawing and the remaining chart illustrates the DC attenuation filter lower right and enhancement filter upper left and their combination in the lower left of the drawing.

Turning our attention to FIG. 3 that illustrates a filter kernel 50 and how the coefficients of the one dimensional filter are located along the horizontal X axis as X−2, X−1, XY0, X+1, and X+2 from left to right. Likewise, the coefficients of the same one dimensional filter are applied to the vertical Y axis as Y−2, Y−1, XY0, Y+1, and Y+2. As a result, the coefficients now form the basis for a two dimensional filter. The values in the open spaces or boxes of the four quadrants of the graph may be derived using orthogonal combinations of the two one dimensional filters or if desired, may be assigned appropriate constants. In FIG. 3, these constants have been set to zero.

The remaining three grids in FIG. 3 illustrate how a two dimensional DC attenuation filter 52 is combined with the two dimensional enhancement filter 54 to create a combined convolution FIR filter 56.

Figure 4:
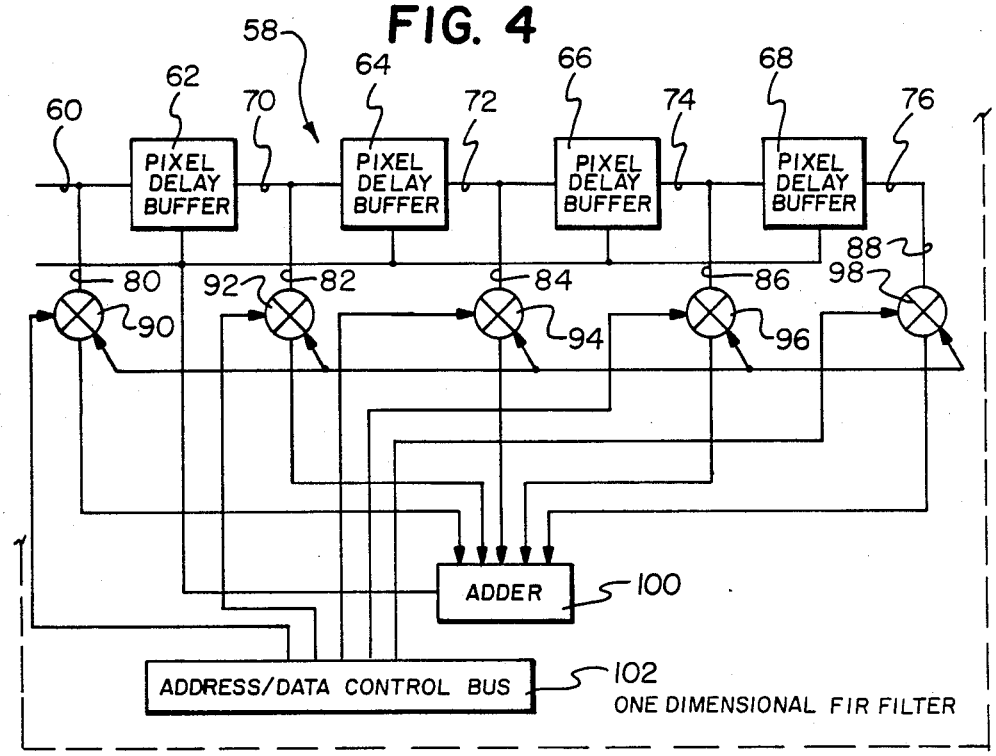
FIG. 4 depicts a block diagram for a one dimensional FIR filter.

Referring now to FIG. 4, where a one dimensional FIR filter circuit 58 is illustrated. Filter 58 is comprised of one dimensional X filter section 5 pixels in length.

The X filter section 58 has image pixels inputted thereto from a suitable source via bus 60, and includes a series of one-pixel delay buffers 62, 64, 66, and 68. Buffers 62, 64, 66, and 68 are connected in series by serial buffer buses 70, 72, and 74 respectively, with input bus 60 coupled to the input port of the first buffer 62. A buffer output bus 76 is coupled to the output port of buffer 68.

The incoming video signal has been digitized prior to being processed by filter 58. It is understood that the number of bits required is a function of the resolution desired and is typically 6-8 bits.

Image pixel input bus 60, serial buffer buses 70, 72, 74, and 76 are coupled through buses 80, 82, 84, 86, and 88 and multipliers 90, 92, 94, 96, and 98 to adder 100. Multipliers 90, 92, 94, 96, and 98 service to multiply the image pixels in buses 80, 82, 84, 86, and 88 by preset filter factors (as shown in filter grids in FIG. 3) [h (x−1)] [h (x−2)] [h (xy)], etc. input to multipliers 90, 92, 94, 96, and 98 through control buses 102. The processed image pixels outputted by multipliers 90, 92, 94, 96 and 98 are summed by adder 100, to provide composite one-dimensional (i.e. X) filtered image pixels.

Figure 5:
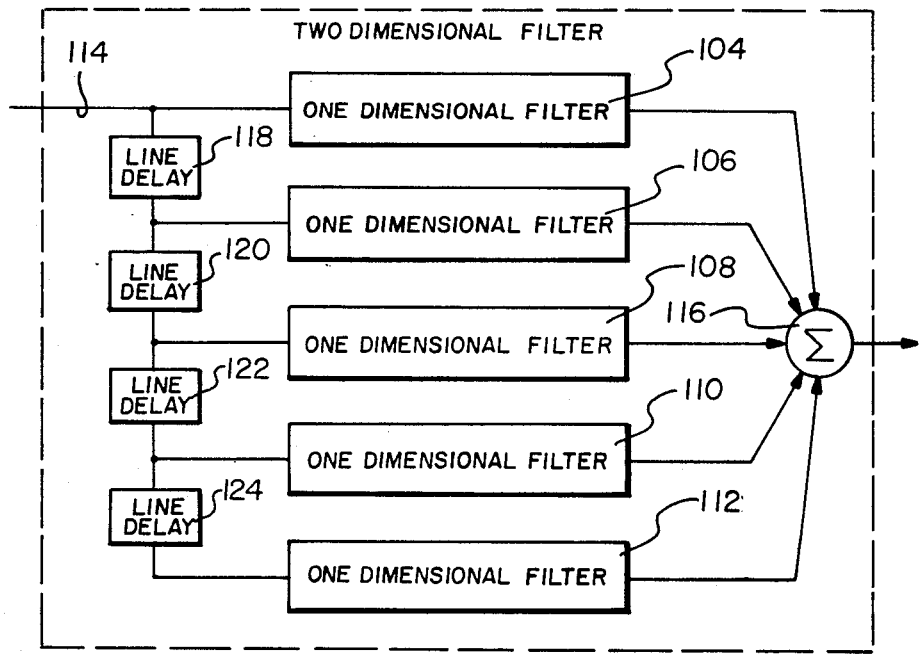
FIG. 5 depicts a block diagram for a two dimensional FIR filter comprising five of the one dimensional filters shown in FIG. 4.

FIG. 5 illustrates how five one dimensional filters 104, 106, 108, 110, and 112 of the type shown in FIG. 4 can be used to make a two-dimensional convolution FIR filter. In operation, the stream of image pixels input bus 114 to the two dimensional filter 116 are clocked through the line delay buffers 118, 120, 122, and 124 (that correspond to pixel delay buffers 62, 64, 66, and 68 of FIG. 4). On each clock pulse, the pixel output of these buffers and the instantaneous image pixel are processed by the coefficient multipliers (that correspond to multipliers 90, 92, 94, 96 and 98 in FIG. 4) and the results are summed in adder 116 (that corresponds to adder 100 in FIG. 4) to provide filtering along the Y axis. FIG. 5 shows how a plurality of one dimensional FIR convolution filters can be combined using line delays 118, 120, 122, and 124 to delay each of five scan lines to produce a 5-by-5 two dimensional FIR convolution filter.

Convolution can substantially compensate for the loss in resolution. The amplitude of the pixel situated at the beginning of the edge will be substantially increased while that of all surrounding pixels will be decreased although by an amount less than the increase. As a result, the amplitude of the former pixel will reach a peak at a positive value that is substantially higher than the original intensity level, thereby producing a "spike" in the convolution output, while the values of the pixels will become somewhat negative creating a "moat" around the peaked value. In this manner, the sharpness of the image is substantially enhanced. The size of the window is set to 5-by-5 in order to achieve a good compromise between hardware costs and complexity and resulting image quality. Generally, as the size of the window increases, image quality will correspondingly increase as the convolution operation is able to detect pixel changes occurring in additional directions and frequencies. Unfortunately, the cost and complexity of implementing the convolution circuit also increases as the window size increases. Specifically, use of a 3-by-1 or 1-by-3 pixel window only sharpens horizontal and vertical pixel patterns and is generally unacceptable for text. Use of a 3-by-3 window sharpens pixel patterns that occur not only horizontally and vertically but also diagonally through the center pixel in the window. Use of a 5-by-5 pixel window sharpens additional diagonally oriented pixel patterns. For textual images, a 5-by-5 window provides an acceptably high degree of image enhancement. Consequently, this size is used, in view of the additional cost and complexity of the necessary hardware associated with implementing larger windows. Clearly, as the size of memory circuits and shift registers increase and their cost decreases, larger windows can be implemented and used.

Illustrated below is a 5×5 low pass convolution FIR filter which provides DC attenuation of the digital signal. This represents the preferred values for the filter if there were no cost constraints on the amount of memory being required for such a filter.

| .007 | .030 | .039 | .030 | .007 |
|------|------|------|------|------|
| .030 | .057 | .067 | .057 | .030 |
| .039 | .067 | .080 | .067 | .039 |
| .030 | .057 | .067 | .057 | .030 |
| .007 | .030 | .039 | .030 | .007 |

To produce a unity output in response to a constant input (DC), the values of the coefficients are selected to sum to one. However, it should be remembered that in this instance, the convolution enhancement filter was combined with digital DC attenuation filter is intended to reduce the gain to less than one. The DC gain was attenuated by 70-80% so that the overall gain of the combined filters resulted in a 30-20% DC response.

Figure 6:
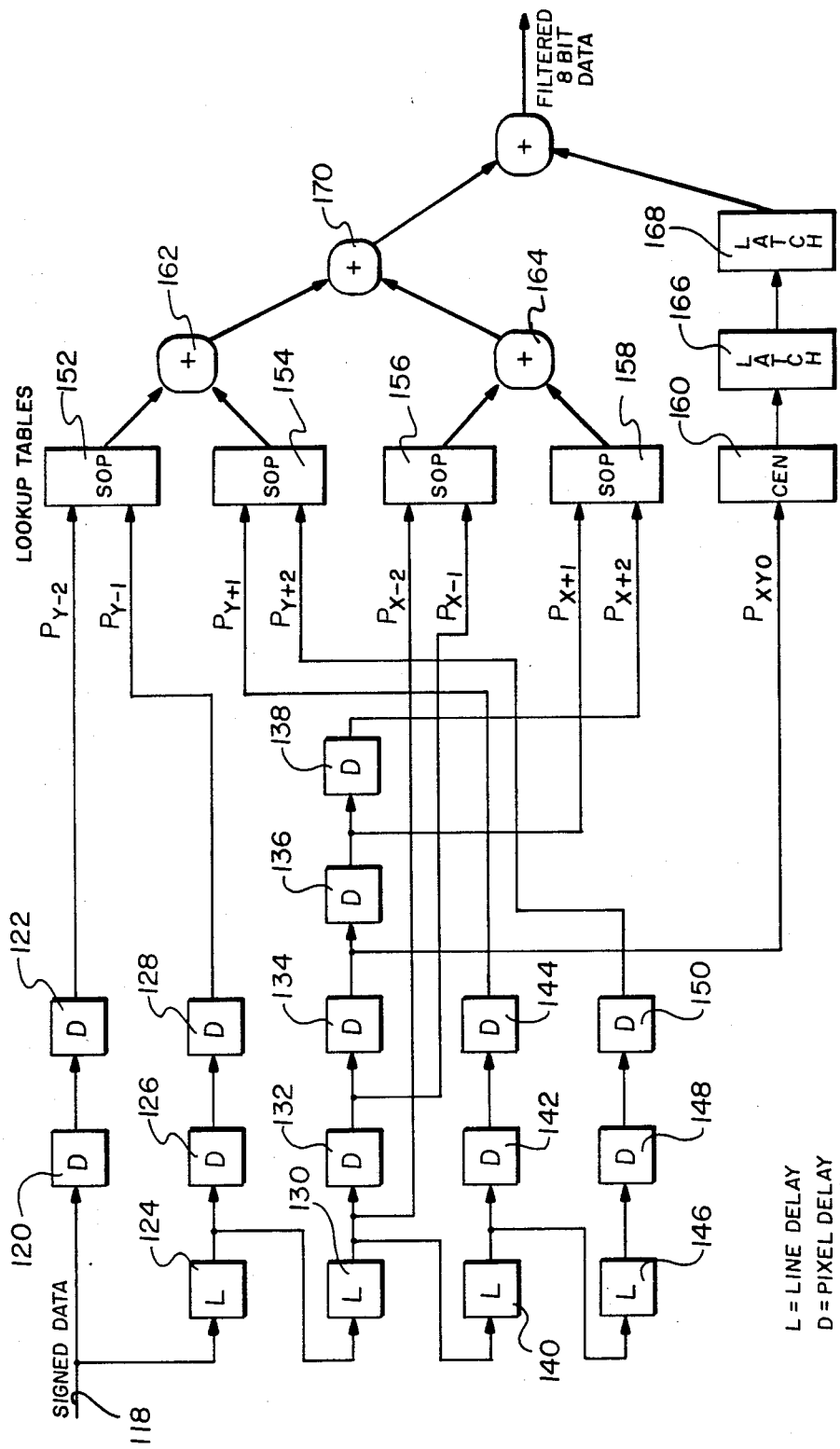
FIG. 6 depicts an alternative embodiment for implementing the combination FIR filter of the present invention.

FIG. 6 illustrates a second embodiment of a circuit that can generate the convolution FIR filter coefficients and output filtered 8 bit data for the central pixel of the combined filter. As was mentioned earlier, in the interest of simplifying the circuitry required, both the attenuation and enhancement filters were combined. A block diagram for an implementation of the filter kernel shown in the upper righthand corner of FIG. 3 and is labeled as filter kernel 50. Each pixel value Y−2, Y−1, x−2, x−1, XY0, etc. is applied to the matrix a row at a time as the pixel values are sent seriatim on the data line 118. Y−2, the only value used in the first row is delayed by two pixel delays 120, 122. Similarly, Y−1 in the second row is delayed by line delay 124 and pixel delays 126, 128. The third row x−2, x−1, XY0, x+1, x+2 are all delayed by line delay 130 and as the pixel values move to the right in the row, each one must pass through one additional line delay than those on its immediate left. Thus, x−2 is delayed only by line delay 130, x−1 is delayed by pixel delay 132 with XY0 being delayed by pixel delays 132, 134, with x+1 delayed by pixel delays 132, 134 and 136. Last in that row, x+2 is delayed by pixel delays 132, 134, 136, and 138. The last two rows follow the same pattern Y+1 receiving additional line delay 140 and pixel delays 142, 144. For Y+2, line delay 146 and pixel delays 148 and 150 are required in addition to the three previous line delays 124, 130, 140. Each of the pixel values used in the matrix are then applied to the two dimensional FIR filter comprised of lookup tables 152, 154, 156, 158 and 160, the last mentioned being for the central pixel value. In each lookup table the value of the pixel is multiplied by a coefficient (h) associated with the filter matrix. However, instead of actually performing the multiplication, the sum of the products can be obtained using the lookup table. For example, Y−2 and Y−1 are inputted to lookup table 152 where each pixel value is multiplied by the appropriate coefficient that is part of the filter matrix; the products are outputted to adder/latch 162 where the values of Y+1 and Y+2 and their respective products are summed with the output from lookup table 154. Likewise, the product values associated with x−2 and x−1 are outputted from lookup table 156 to add-/latch 164, which receives and combines the output of lookup table 158 with the output of lookup table 156. The product associated with central pixel h (XY0) is performed in lookup table 160 the output of which is sent to two latches 166, 168 to introduce the appropriate delay so that it will arrive at the final add/latch 172 a the appropriate time. The outputs of add/latches 162 and 164 are summed and latched by add/latch 170. The final add/latch 172 sums the output of add/latch with the product value of the central pixel and its coefficient 170 resulting in the filtered 8 bit value for the central pixel of the matrix. The appropriate equations are as follows:

$$SOP = \text{Coef 1}*(\text{Pixel 1}-\text{Offset}) + \text{Coef 2}*(\text{Pixel 2}-\text{Offset})/\text{Coef 0}$$

$$Cen = \text{Pixel 0} - \text{Offset}$$

Using coefficients from FIG. 3 Chart 56 and an Offset = 256/2 = 128

The calculations in each lookup table are as follows:

$$SOP\ 152 = C_{Y-1}*(P_{Y-1}-128) + C_{Y-2}*(P_{Y-2}-128)/C_{XY0}$$

$$SOP\ 152 = 0.125*(P_{Y-1}-128) + -0.031*(P_{Y-2}-128)/1.624$$

$$SOP\ 154 = 0.125*(P_{Y+1}-128) + -0.031*(P_{Y+2}-128)/1.624$$

$$SOP\ 156 = 0.125*(P_{X-1}-128) + 0.031*(P_{X-2}-128)/1.624$$

$$SOP\ 158 = 0.125*(P_{X+1}-128) + -0.031*(P_{X+2}-128)/1.624$$

$$CEN\ 160 = P_{XY0} - 128$$

where
SOP = sum of the products
CEN = central pixel

Returning to FIG. 1, it can be seen that after each and every pixel in the image has passed through the combined enhancement and DC attenuation filters the pixels of the image are sent to Ordered Dither filter 20 to produce an appropriate grayscale.

One may add a two-dimensional pseudonoise sequence to an input image prior to quantization to two gray levels. The result is that the spatial distribution of the errors allows an observer to integrate the average percent reflectance in a small region and, therefore "see" a near continuum of gray level. It should be noted that "ordered dither" or pseudorandom thresholding is simply a form of electronic screening. Adding a known waveform to an image signal prior to comparison to a fixed threshold is equivalent to comparing the input signal with a variable threshold of the same shape as the waveform added. A unique feature of ordered dither is that it results in a dispersed set of black and white dots instead of a single "dot" as in the analog of the photomechanical screening process.

By selecting a dither signal with a sufficient number of thresholds minimal contouring will be visible with ordered dither as with classical electronic screening. There will be multiple "dots" per halftone cell, but the resultant low frequency rendition will be as accurate as that of the "single dot per cell" halftone version. On the other hand, ordered dither results in the highest level of capability to detect fine detail for a given halftone cell frequency, and this is an area of superiority of this technique. A processing apparatus of this type is disclosed in U.S. Pat. No. 4,517,605.

Figure 7:
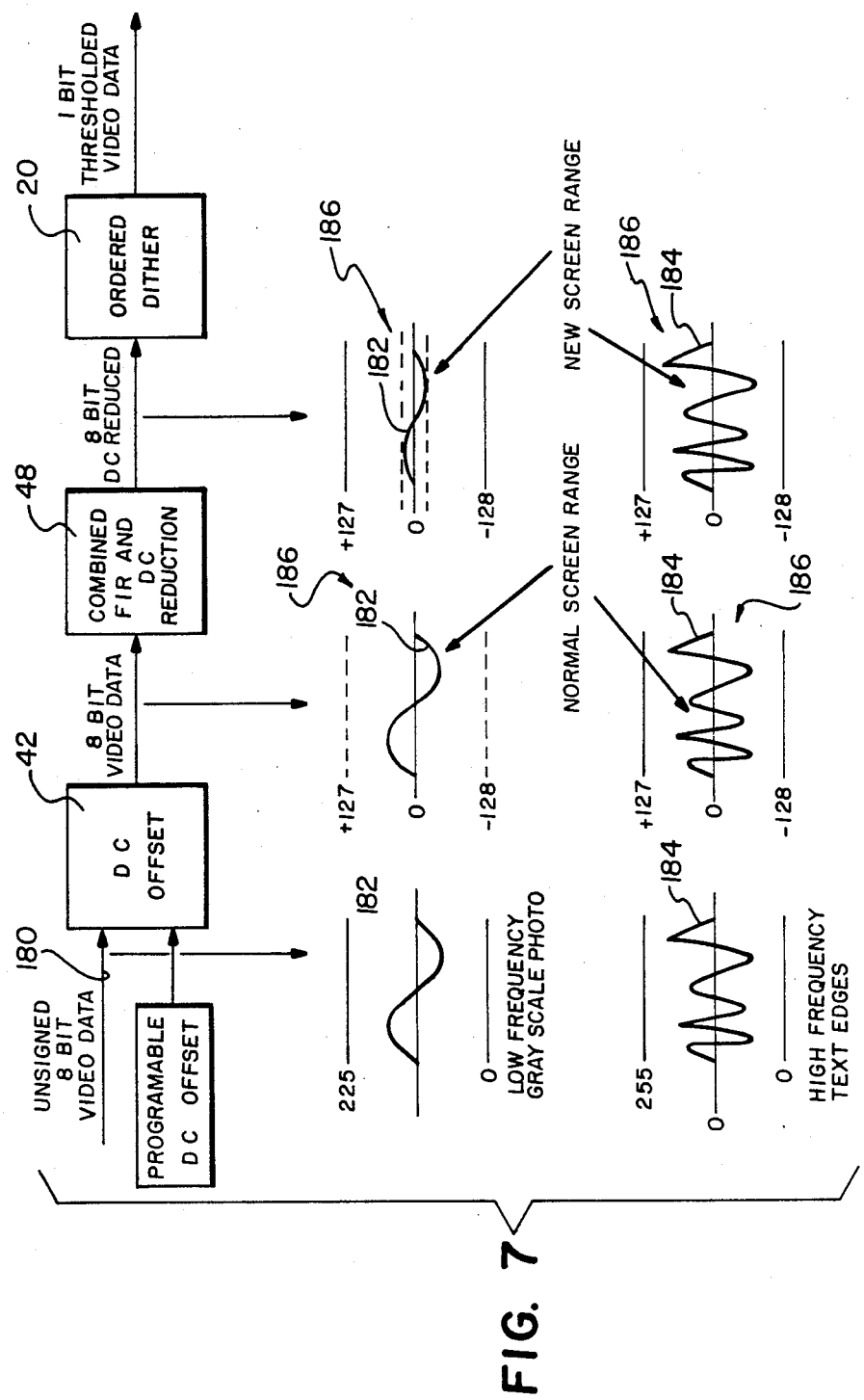
FIG. 7 depicts waveforms of the scanned image data at different points in the processing sequence in accordance with the present invention.

Referring to FIG. 7, one can observe the signal changes at different points in the circuit for both high and low frequency signals. It should be noted that for clarity, analog signals are shown.

Unsigned 8 bit video data enters on lead 180 coming from the A/D converters 26 and 29 and pre-scan processing circuit 40 which may be in the form of low frequency grayscale information 182 or high frequency text information 184 both in the range from 0–255.

After passing through DC offset 42 which changes the level of the information by a DC constant to a typical range of −128 to +127. As can be seen, both the low and high frequency signals fall well within this normal screen or dither range 186.

After the signals pass through the combined enhancement (FIR) filter and the DC attenuation filter 48, the DC attenuation of that filter has substantially reduced the peak-peak range of the low frequency signal. The screen or dither range 186 should be selected such that the low frequency signals tend to remain within the reduced screen range. Thus, it can be seen that when this low frequency signal is fed to the ordered dither circuit 20, it will act over the attenuated range so that the low frequency signal 182 will get the full effect of the dither.

It should also be noted that because signed numbers are used as a result of the DC offset procedure, a black pixel will tend toward gray and any pixel that is white will tend towards gray also. Such an arrangement allows the higher frequency signals 184 to cross over the zero threshold and become thresholded as if it were being adaptively thresholded.

Unlike the low frequencies 182 which remain within the new screen range 186, the high frequency signal 184 has a portion of the signal fall outside the new screen range 186; accordingly, when this signal is applied to the ordered dither circuit 20, the amplitudes remain unchanged and the peaks of the high frequency signal 184 goes outside of the range 186 of the dither and therefore, pass through unaffected.

INDUSTRIAL APPLICABILITY AND ADVANTAGES

The present invention is useful in image management systems and generally in systems for enhancing and thresholding scanned multi-bit images. The present invention advantageously provides improved tonal rendition from the scanned image and sharpens edges occurring in the image.

What is claimed is:

1. An image signal processing apparatus comprising:
   image scanning means having optical means for scanning an original in a two-dimensional manner, and photoelectric converting means for converting an optical image obtained by said optical means into an electrical signal;
   DC offset means for removing a predetermined DC level from said peak to peak electrical signal to provide a predetermined DC offset;
   analog to digital conversion means for converting said electrical signal into a digital signal;
   digital attenuation filter means having less than unity gain for providing a DC attenuation of said electrical signal; and
   dither converter means using at least a main dither matrix for performing dither conversion of said digital signal.

2. An image signal processing apparatus according to claim 1 wherein said dither converter means comprises plural sub-dither matrices.

3. An image signal processing apparatus according to claim 2 wherein said digital attenuation filter means is a convolution finite impulse response filter.

4. An image signal processing apparatus according to claim 2 wherein said plural sub-dither matrices are arranged in said main dither matrix such that the averages of dither levels in said sub-dither matrices represent a high spatial frequency.

5. An image signal processing apparatus according to claim 3 wherein said processing apparatus further includes a second convolution finite impulse response filter for providing image enhancement.

6. An image signal processing apparatus according to claim 5 wherein said attenuation filter and said second convolution finite impulse response filter are combined in a single filter.

7. In an apparatus for processing image signals derived by raster scanning document originals the combination comprising:
   means for converting said raster scanned image signal into a digital signal;
   DC offset means for removing a predetermined DC level from said digital signal resulting in a predetermined DC offset;
   digital attenuation means having less than unity gain for providing a DC attenuation of said digital signal; and
   dither converter means including a main dither matrix for performing dither conversion of said digital signals.

8. An apparatus for processing image signals according to claim 1 wherein said digital attenuation filter means is a convolution finite impulse response filter.

9. An apparatus for processing image signals according to claim 8 wherein said processing apparatus further include a second convolution finite impulse response filter for providing image enhancement.

10. An apparatus for processing image signals according to claim 9 wherein said attenuation filter and said second convolution finite impulse response filter are combined in a single filter.

* * * * *